United States Patent [19]

Fujan et al.

[11] Patent Number: 5,064,242
[45] Date of Patent: Nov. 12, 1991

[54] ROLLOVER PROTECTION CAB FOR LARGE OFF-ROAD MACHINES

[75] Inventors: Steven J. Fujan, Sand Springs; Frederick W. Loeber, Tulsa, both of Okla.

[73] Assignee: Terex Corporation, Green Bay, Wis.

[21] Appl. No.: 607,905

[22] Filed: Nov. 1, 1990

[51] Int. Cl.$^5$ ............................................. B62D 33/06
[52] U.S. Cl. ..................................... 296/190; 296/197
[58] Field of Search ............... 296/190, 102, 197, 196; 280/756

[56] References Cited

U.S. PATENT DOCUMENTS

| | | | |
|---|---|---|---|
| 13,600 | 9/1855 | Nelson | 135/88 |
| 447,097 | 2/1891 | Zoller et al. | 296/102 |
| 1,312,422 | 8/1919 | Norton | 296/102 |
| 3,149,878 | 9/1964 | Heermann | 296/102 |
| 3,578,377 | 5/1971 | Babbitt et al. | 296/102 |
| 3,612,581 | 10/1971 | Frankenberg et al. | 287/20 |
| 3,632,134 | 1/1972 | Babbitt et al. | 296/102 |
| 3,768,856 | 10/1973 | Stuller | 296/190 |
| 3,785,696 | 1/1974 | Moore et al. | 296/102 |
| 3,866,942 | 2/1975 | Debeus et al. | 280/150 C |
| 3,868,190 | 2/1975 | Moore | 403/189 |
| 4,023,851 | 5/1977 | Palmer et al. | 296/190 |
| 4,061,392 | 12/1977 | Lowder et al. | 296/190 |
| 4,978,163 | 12/1990 | Savio | 296/190 |

Primary Examiner—Robert R. Song
Attorney, Agent, or Firm—Head & Johnson

[57] ABSTRACT

A cab for rollover protection of a driver of a large off-road machine in which the machine has a frame with a longitudinal axis in the direction of normal travel, the cab being formed of a superstructure of a generally rectangular box configuration, one lower edge of the cab superstructure being pivotally affixed to the machine frame about an axis of pivotation substantially parallel to the vehicle frame longitudinal axis and a limited displacement shock absorber attaching the cab superstructure other edge to the machine frame so that thereby in the event of rollover of the vehicle, the shock absorber absorbs energy to reduce the possibility of collapse of the superstructure to thereby provide increase safety to the machine operator.

The cab may be formed of a superstructure with a modular system including a control instrument module removably attached to the superstructure front, an environment control module removable attachable to the superstructure back, and left and right door modules removaly attachable to the superstructure left and right sides, whereby the modules may be separately manufactured and removable for repair without removing the entire cab superstructure.

16 Claims, 5 Drawing Sheets

ROLLOVER PROTECTION CAB FOR LARGE OFF-ROAD MACHINES

BACKGROUND OF THE INVENTION

Large off-road machines are employed for moving large quantities of earth, such as in building highways or dams, and are used in hauling ore as a part of mining operations. These large machines are required to travel at fairly fast speeds for efficiency and economy of operation and normally travel on temporary road surfaces or over terrain on which work is being preformed. For this reason, these large off-road machines are somewhat dangerous to operate since conditions do not permit construction of smooth, level roadbeds in most work situations. With the heavy loads, at fairly fast speeds and uneven terrain, the possibility of rollover of large machines, while relatively infrequent, nevertheless, is a safety concern of manufacturers and users of such machines. For this reason, it is important to provide protection for an operator of such large off-road machines, and such protection is concentrated in the construction and the arrangement of the cab in which the driver controls the machine.

The Society Of Automotive Engineers has provided a design criteria entitled "Performance Criteria For Rollover Protection Structures (ROPS) For Construction, Earthmoving, Forestry, And Mining Machines—SAE J1040 APR88." The performance criteria sets out the suggested design requirements for the protection of a machine operator. Generally speaking, the design requirements relate to providing a superstructure cab housing having prescribed plastic deformation limits so that in the event of rollover, the cab superstructure will deform but not collapse. The plastic deformation of a frame superstructure is somewhat difficult to fully predict in advance. The present disclosure is directed toward a cab superstructure and the means for arranging the same to permit more predictable behavior of the cab superstructure in the event of rollover, with a higher confidence level in the design than is typically available.

When lateral force is applied to the rollover protective structure (ROPS), a force is introduced which must be absorbed either by plastic deformation or by some other method. The present disclosure improves the method of energy absorption thereby providing a safer environment for an operator.

For background information relating to rollover protection as suggested by others, reference may be had to the following U.S. Pat. Nos. 13,600; 447,097; 1,312,422; 3,149,878; 3,612,581; 3,632,134; 3,868,190 and 3,866,942.

SUMMARY OF THE INVENTION

A cab for rollover protection of an operator of a large off-road machine is provided. The machine has a frame with a longitudinal axis in the direction of normal travel. The machine has opposed sides spaced from a vertical plane of the longitudinal axis, and a front.

A cab superstructure is provided of generally rectangular box-like configuration which provides an interior space for an operator. The superstructure has a bottom with an outer edge, an inner edge and a front. The cab superstructure is positioned on the machine frame with the bottom outer edge adjacent the vehicle side, and the front in the direction of the machine front.

The cab superstructure bottom inner edge is pivotally attached to the machine frame about an axis of pivotation substantially parallel to the machine frame longitudinal axis. The cab superstructure outer edge is secured to the frame by means of limited displacement shock absorbers. In the preferred arrangement, the shock absorbers are in the form of having a lower plate with an opening therethrough. A paralleled spaced apart upper plate has an opening through it and the upper plate is attached to the machine frame. A crushable medium is positioned between the lower and upper plates. A drawbolt is received in the opening in the plates and through the crushable medium. One end of the bolt is in engagement with the lower plate and the other end is in engagement with the cab superstructure. In the event of a rollover the crushable medium will, upon the application of a preselected force, crush and in such crushing action absorbs large amounts of energy, permitting the cab to pivot to a limited extend about the pivotal mount at the superstructure inner bottom edge.

In another embodiment, the use of a hydraulic cylinder with a piston therein is employed to absorb energy as the cab superstructure is permitted to pivot in the event of a rollover.

The cab for a machine may be completed by affixing pre-manufactured modules to the superstructure. To the superstructure left and right hand sides door modules are attached. An environmental control module may be removably secured to the back of the superstructure, while a control instrumentation module is removably attached to the cab superstructure front. By employment of modular systems on the front, back and sides of the cab superstructure, manufacturing economy is obtained and repair is simplified since the various modules may be independently removed for repair without the necessity of removing the entire cab.

A better understanding of the invention will be had by reference to the following description and claims, taken in conjunction with the attached drawings.

DESCRIPTION OF THE PREFERRED EMBODIMENT

Figure 1:
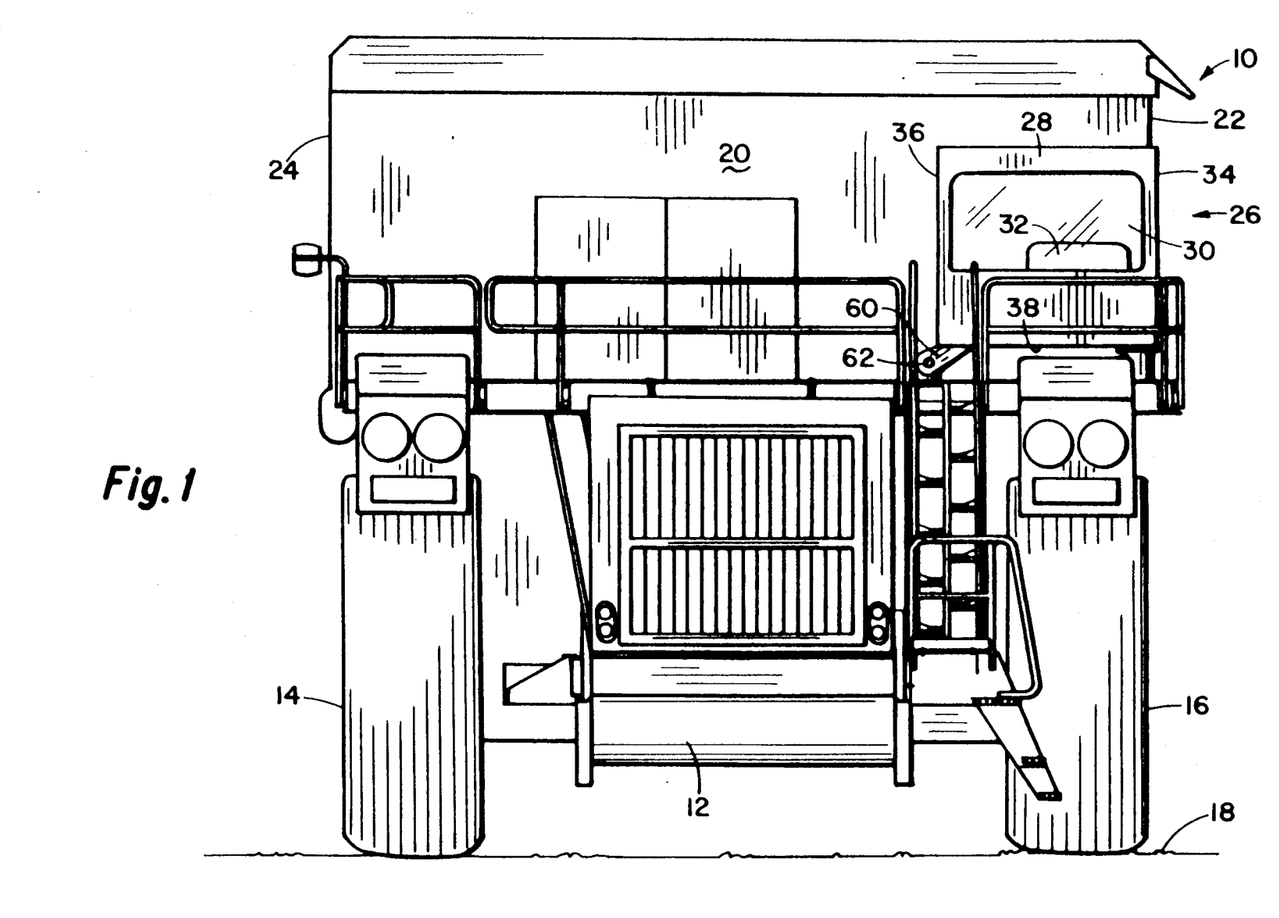
FIG. 1 is an elevational front view of a large off-road machine having a rollover protection cab thereon.

Referring to the drawings and first to FIG. 1, a large off-road machine is indicated generally by the numeral 10 having a frame 12. The machine includes front wheels 14 and 16 resting on ground surface 18, the rear wheels not being seen.

The machine has a front 20 in the direction of the normal machine movement. Further, the machine has a first side 22 and a second side 24. The machine sides 22 and 24 are parallel and spaced apart from each other and are in vertical planes generally parallel to the vertical plane of the machine longitudinal axis, the longitudinal axis being in a vertical plane of the machine's normal direction of movement.

Mounted on the machine is a cab generally indicated by the numeral 26. The cab provides the environment within which a driver operates vehicle 10. The cab 26 has a front 28 which is in the direction of the machine front 28. Front 28 typically has a windshield 30 therein through which an operator looks as he controls the movement of the machine. The cab 26 includes a seat 32, only the top portion of which is seen. Cab 26 has a first side 34 which is adjacent the machine first side 22 and an opposite side 36. The cab has a bottom 38.

The primary object of this invention is to provide a cab 26 having improved rollover protection for the machine operator.

Figure 2:
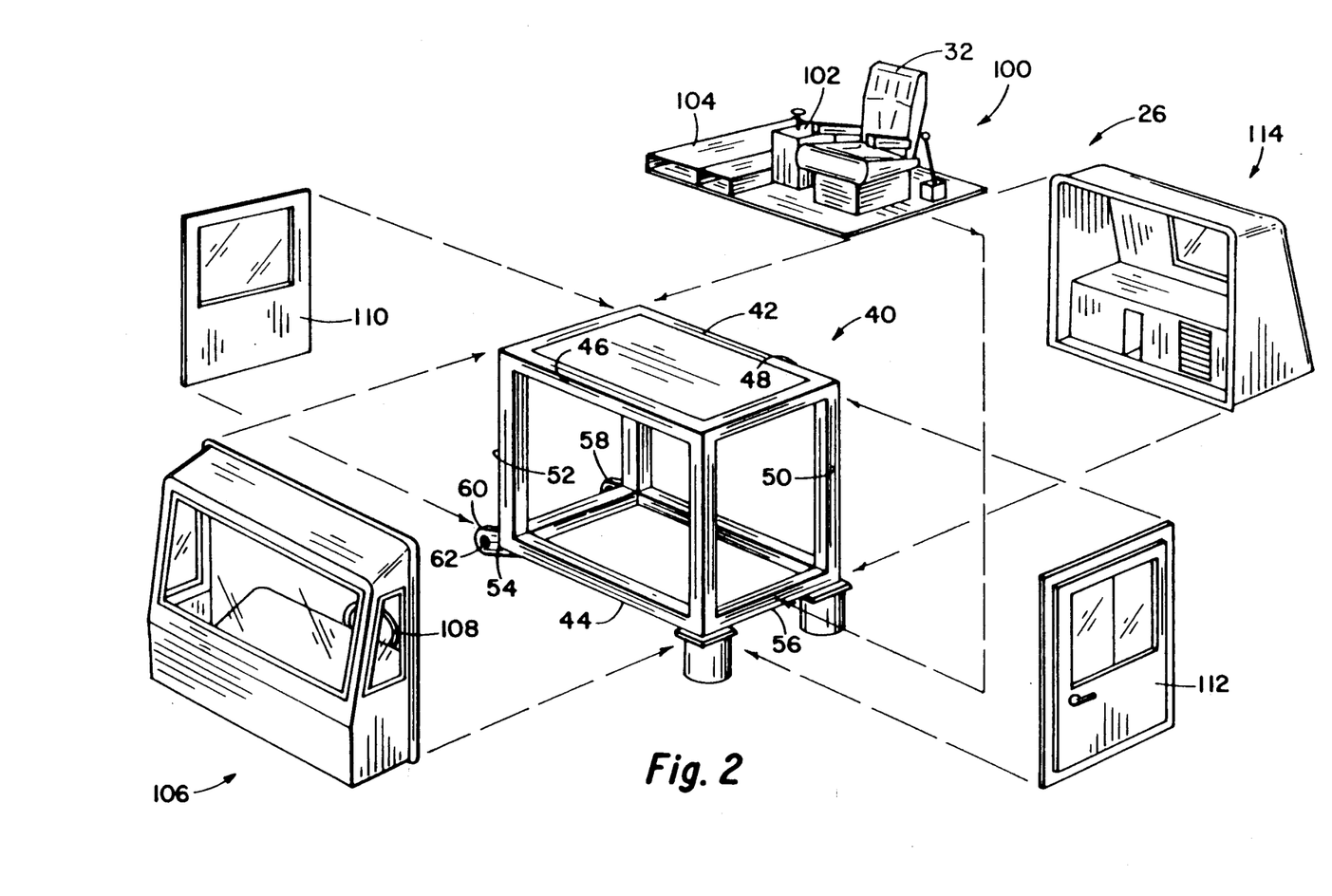
FIG. 2 is an exploded view of a cab superstructure as may be employed in the practice of the invention herein and showing the use of modules that may be employed to complete the cab as used by an operator of a large off-road machine.

Referring to FIG. 2, more details of cab 26 are illustrated. The cab is formed of a superstructure, generally indicated by the numeral 40. The superstructure is of a generally rectangular box-like configuration fabricated of metal structural components. The superstructure provides a substantially rigid enclosure in which an operator is housed, and the superstructure also provides means for attachment of all of the components required by the operator for operation of the machine. As will be described subsequently, cab 26 is completed by attachment to superstructure 40 a series of modular units.

The cab superstructure 40 has a top 42, a bottom 44, a front 46, a rear 48, a first side 50 and a second or opposite side 52. At the intersection of the superstructure bottom 44 and opposite side 52 is a bottom inner edge 54 and in like manner, at the intersection of the superstructure first side 50 and bottom 44 is an outer edge 56. The superstructure inner edge 54 is pivotally secured to the machine frame about an axis of pivotation which is parallel to the machine frame longitudinal axis. The pivotal mounting of superstructure 40 is accomplished by means of first and second trunnions 58 and 60 which extend from the superstructure inner edge 54. Each of the trunnions has an opening 62 therethrough for pivotally receiving a pin (not shown) by which the superstructure is pivotally mounted to the machine frame.

The outer edge 56 of the superstructure is secured to the frame by a shock absorption means, the details of which will be described subsequently.

Figure 3:
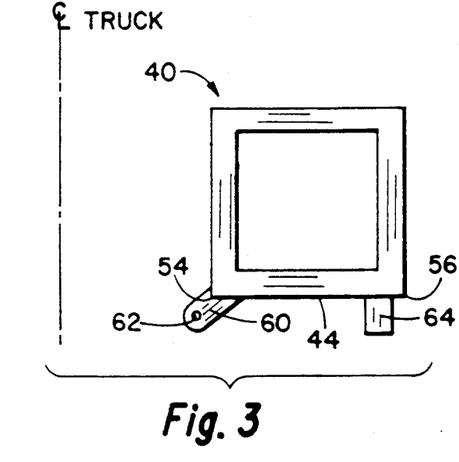
FIG. 3 is a diagrammatic representation of a cab superstructure employing the principles of this invention and showing the superstructure as it normally is positioned with respect to the centerline of a machine frame during normal operations.
Figure 4:
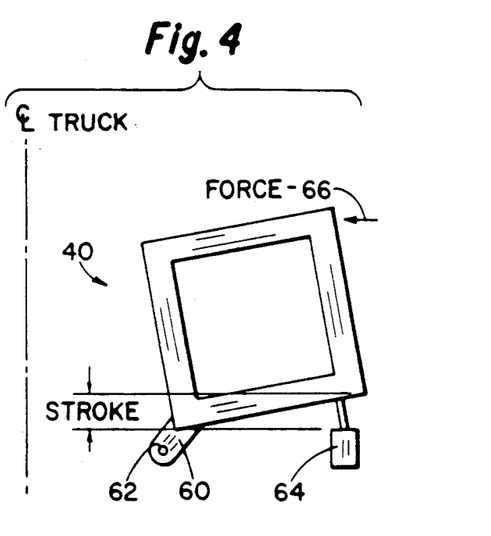
FIG. 4 is a diagrammatic representation of a cab superstructure as in FIG. 3 and showing the effect of force applied to the superstructure in the event of vehicle rollover.

Referring to FIGS. 3 and 4, the principle of operation of the rollover protection system of this invention is diagrammatically illustrated. The cab superstructure 40 is shown as pivoted about trunnion openings 62 at the inner edge 54. The outer edge 56 is secured by means of at least one shock absorption means 64. As shown in FIG. 3, when the machine is operating normally the cab superstructure 40 rests with bottom 44 positioned generally horizontally and with the operator within the superstructure in position to operate the machine. The effect of a rollover is diagrammatically illustrated in FIG. 4. It is presumed that the rollover, which requires protection of the operator, occurs when the machine tips over on the left side or the operator's side, that is, the machine side 22. If the machine rolls over on to the opposite side 24, cab 26 is spaced far enough from such opposite side that the possibility of the cab being damaged or deformed so as to impair the safety of the operator is substantially nonexistent. Therefore, the rollover protection required for a large machine requires consideration only when force is applied from the operator's side of the machine, such force being indicated by the numeral 66.

Force 66 pivots the cab superstructure 40 about pivot point openings 62. The force is totally absorbed or at least substantially absorbed by shock absorber 64. The absorption of a large quantity of energy by shock absorption device 64 substantially reduces the possibility of collapse of cab superstructure 40 and further, by the employment of such shock absorption means 64 the possibility of plastic deformation of the superstructure is substantially reduced. The use of shock absorption means 64 results in improved predictable behavior with a high confidence of the effect of rollover of a machine, as such rollover potentially effects the cab of the machine and the operator's safety. Further, by the use of such shock absorber 64 the superstructure 40 may be of lighter weight and lower cost compared to the superstructure which is otherwise required to meet SAE Standards without such shock absorption system. Further, the use of the shock absorption system simplifies the design analysis of the structure.

Figure 5:
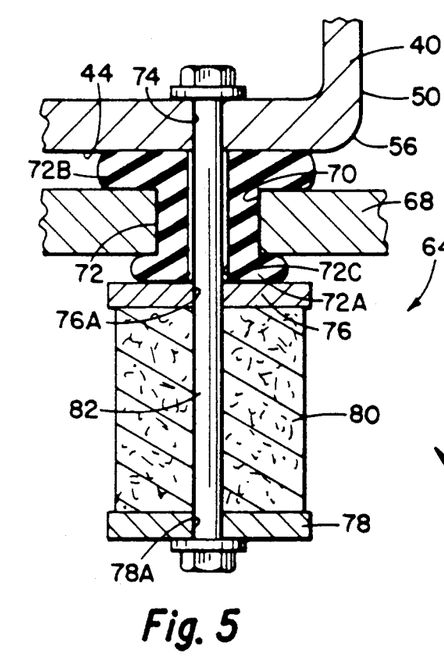
FIG. 5 is an enlarged detailed view of one shock absorption means for securing the cab superstructure to the frame of a machine.

FIG. 5 shows details of one preferred embodiment of the shock absorption system 64. A portion of the vehicle frame is indicated by the numeral 68 and has an opening 70 therein. Received within opening 70 is a large grommet 72 having an enlarged diameter lower portion 72A and an enlarged diameter upper portion 72B, the lower portion lying below frame 68 and the upper portion 72B above the frame. The grommet has an opening 72C therethrough.

The large grommet 72 provides high frequency shock absorption means for securing the cab structure to the machine frame.

The portions of the cab superstructure shown in FIG. 5 are: first side 50; bottom 44; and outer edge 56, and with the superstructure having an opening 74 therethrough.

Positioned below frame 68 is a first plate 76 having an opening 76A therethrough, plate 76 being in contact with the grommet lower enlarged diameter portion 72A. Spaced from the first or upper plate 76 is a second or lower plate 78, likewise having an opening 78A therein.

Positioned between plates 76 and 78 is a mass of crushable medium 80, which may be such as a type manufactured by Hexcel of Dublin, Calif. and sold under the trademark "TUBE-CORE". Such material is constructed of alternate sheets of flat aluminum foil and corrugated aluminum foil wound around a mandrel and adhesively bonded. However, such shock absorption cylinder may also be constructed of other materials, such as fiberglass, graphite, and so forth. The characteristic of the crushable medium 80 is that it does not significantly compress until a preselected minimum load per square inch of cross-sectional surface area is applied. Upon the application of such load the material begins to compress, absorbing significant amounts of energy. Thus, crushable medium 80 would not be compressed or substantially deformed in the normal operation of the machine even over extremely rough roads. However, in the event of the application of force 66 as illustrated in FIG. 4 which would occur in the event of rollover, medium 80 collapses and in so doing significant energy absorption is achieved thereby reducing the possibility of substantial plastic deformation of the cab superstructure 40.

A bolt 82 extends through plates 76 and 78 and crushable medium 80. Bolt 82 also extends through grommet 72 and through opening 74 in the cab superstructure.

Figure 6:
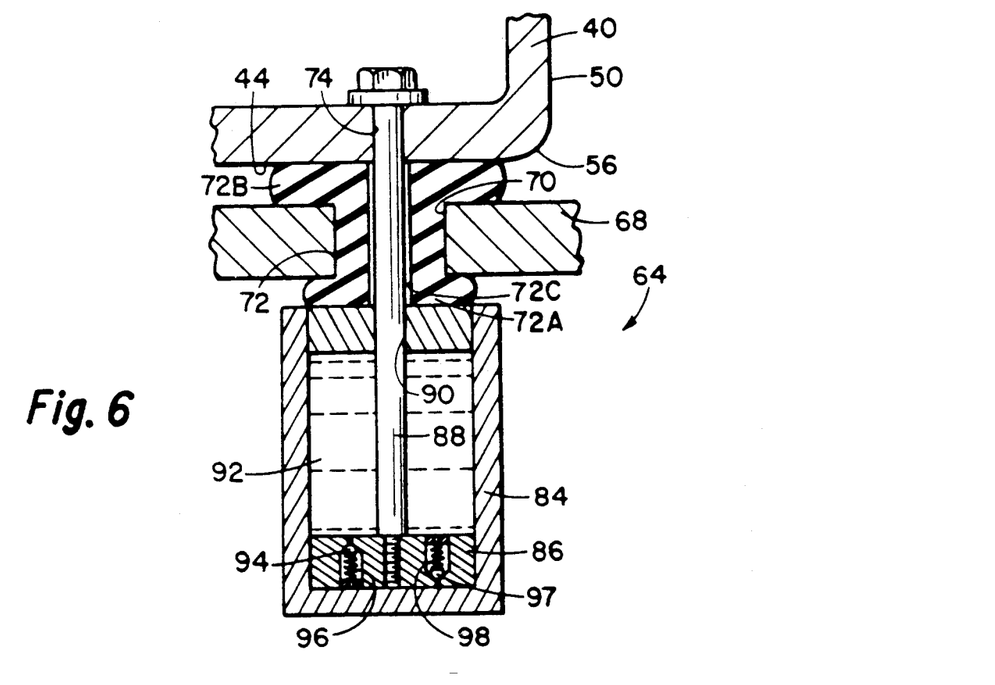
FIG. 6 is an enlarged detailed view as in FIG. 5 and showing the use of a hydraulic cylinder as an energy absorption means for mounting the cab superstructure to a machine frame.

An alternate means of shock absorption is illustrated in FIG. 6. In this alternate means a hydraulic cylinder 84 is employed having a piston 86 therein. A piston rod 88 extends from the piston and sealably through an opening 90 in hydraulic cylinder 84. Piston rod 88 is secured to the cab superstructure 40.

Hydraulic fluid 92 fills the interior of cylinder 84 above piston 86.

Piston 86 has a first valve 94 therein which includes a ball normally closing a passageway through the piston, the ball being held in place by spring 96. When force is applied to the piston rod to move piston 86 upwardly, movement can occur only when the force is sufficient to overcome the resistance of spring 96 after which the piston will move as hydraulic fluid flows through the valve. As the piston moves and fluid is forced through valve 94, high amounts of energy are absorbed.

In order to permit the piston to return to its normal position, a second valve is employed in the piston, indicated by ball 97 and spring 98. The ball 97 and spring 98 allow the fluid to flow in the reverse direction past the piston so that after the hydraulic cylinder has functioned to absorb energy in the event of a rollover, the cab can be returned to its normal position. While the shock absorption system of FIG. 6 is capable of reuse, in the embodiment of FIG. 5 after a rollover the crushable medium 80 must be replaced.

Figure 7:
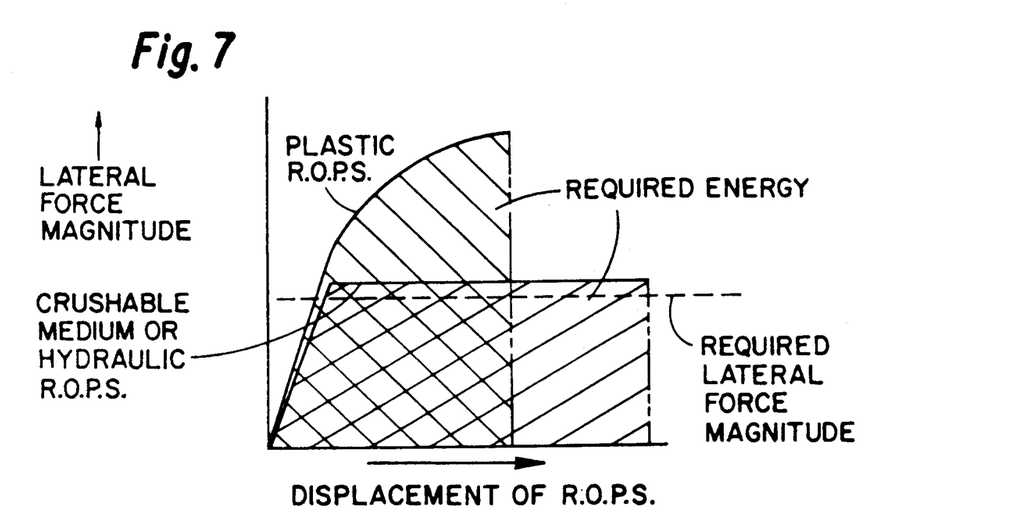
FIG. 7 is a graph showing the lateral force deflection energy absorption characteristics of a crushable medium or a hydraulic cylinder compared to a plastically deformed cab superstructure, indicating that with the crushable medium or hydraulic cylinder large amounts of energy are absorbed as the cab is controllably deflected in the event of a rollover.

FIG. 7 is a graph showing the shock absorption characteristics of both the crushable system of FIG. 5 and the hydraulic system of FIG. 6 compared to a plastically deformed cab superstructure system. The systems have different characteristics as illustrated in the graph, however, they have the common characteristic of absorbing energy in the event of rollover. This graph also illustrates that the required energy is absorbed by the systems of this disclosure with lower imposed force, allowing lighter weight and lower cost of the cab superstructure and frame attachments.

This invention allows the same cab to be applied to a variety of trucks of varying mass without internal change to the cab. As different mass trucks are compared, force 66 varies accordingly. Accommodation of the energy absorption requirement is accomplished by external adjustment to the hydraulic cylinder or collapsible media. The advantage of reduced inventory and permutation of the cabs is achieved.

In order to complete cab 22 as illustrated in FIG. 1, a modular system may be employed, such as shown in FIG. 2. First, a floor module 100 may be removably installed within the superstructure 40. The floor module includes seat 32 as well as a console 102, and ventilation and wiring ducts 104. In addition to or alternative to these, other elements may be included with the floor module as normally employed for operation of large off-road machines.

A control/instrumentation module 106 is affixed to the superstructure front 46 and may include a steering wheel 108 and other instruments and controls as is necessary for operating the machine.

A right-hand door module 110 and a left-hand door module 112 are removably secured to the superstructure sides 52 and 50 respectively.

An environment control module 114 is secured to the superstructure rear surface 48 to complete the cab.

The employment of the separate removable modules that are attached to the superstructure 40 substantially increases economy of construction and ease of repair. The modules can be fabricated to meet the characteristics of individual machines which they are to be employed, while utilizing the same basic cab superstructure 40 for a variety of different machines. In addition, when repair is necessary an individual module may be removed without the necessity of removing the entire cab. The module system illustrated in FIG. 2 thereby reduces the cost of adapting a cab to different machines.

Figure 8:
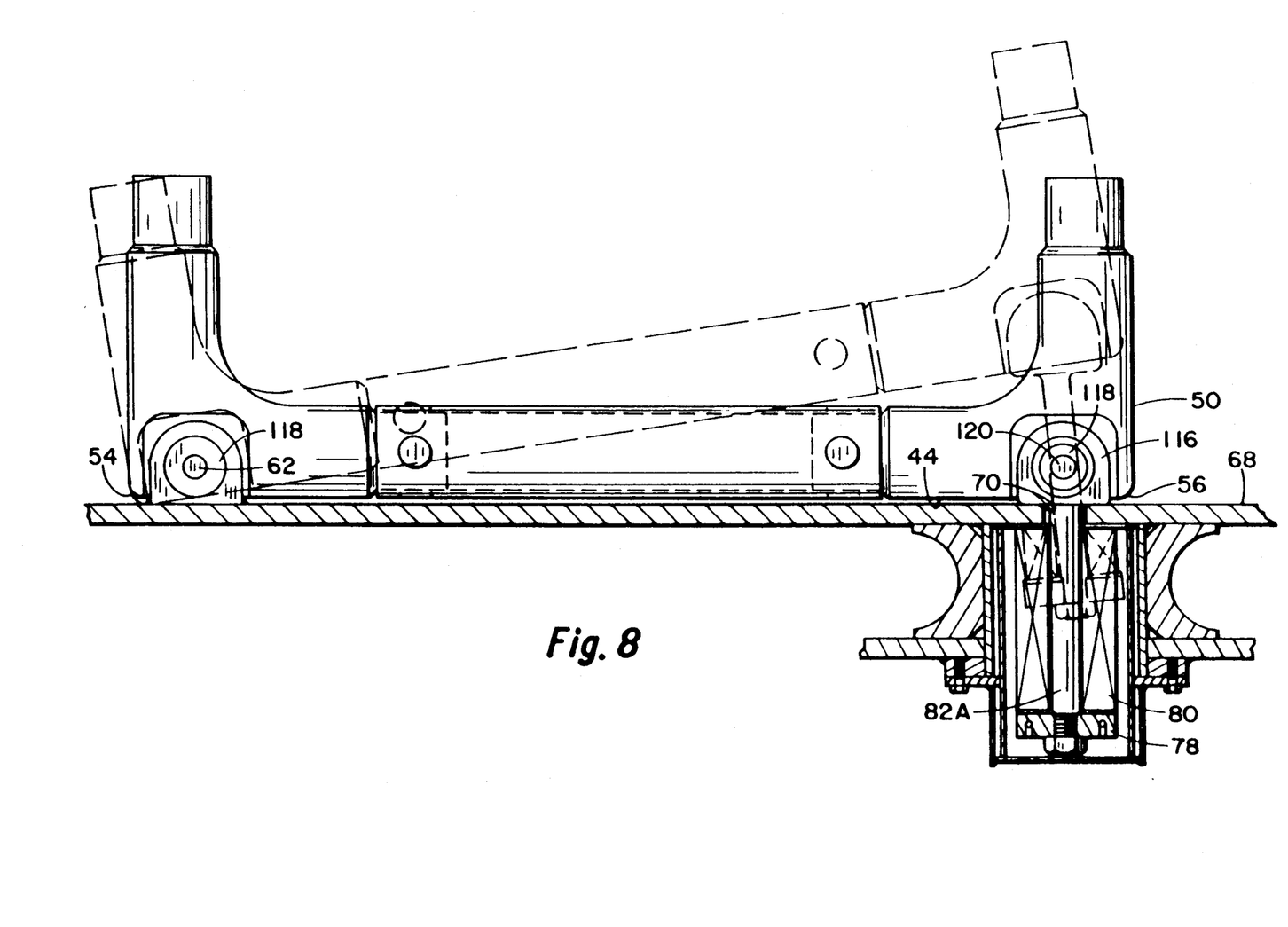
FIG. 8 is a partial elevational and partial cross-sectional view of the lower portion of a cab frame structure and showing an alternate arrangement employing a crushable medium and include elastomeric shock absorption members for mounting the cab superstructure.

FIG. 8 shows an alternate arrangement for supporting the cab superstructure. The frame 68 of the machine on which the cap is mounted has an opening 70 therein as previously described. The opening receives bolt 82A, the lower end of which is affixed to plate 78. The crushable medium 80 is received about bolt 82A and positioned between plate 78 and frame 68.

In the embodiment of FIG. 8 the upper end of bolt 82A has an enlarged head portion 116 which receives an elastomeric shock absorption member 118. By means of a pin 120 the shock absorption member 118 is pivotally secured to the cab superstructure adjacent the outer edge 56.

Figure 9:
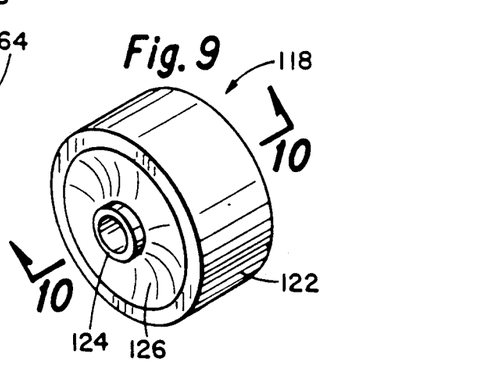
FIG. 9 is an isometric view of a typical elastomeric shock absorber used in the arrangement of FIG. 8 for mounting the cap superstructure.
Figure 10:
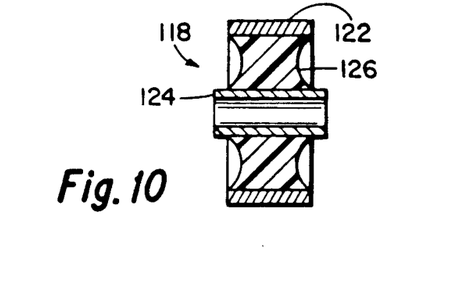
FIG. 10 is a cross-sectional view as taken along the line 10—10 of FIG. 9 of the elastomeric shock absorption mounting member.

The elastomeric shock absorption member 118 is illustrated in FIGS. 9 and 10. Member 118 is readily commercially available and includes an outer circumferential ring 122 and an internal tubular element 124 coaxial with outer ring 122. Between the exterior of tubular element 124 and the interior of ring 122 an elastomeric material 126 is molded. The shock absorption member 118 provides an element affording limited shock absorption movement about three axes.

In addition to the use of an elastomeric shock absorption member 118 to connect bolt 82A to the cab superstructure outer edge 56, a similar member 118 is employed in the arrangement illustrated in FIG. 8 to connect the cap superstructure inner edge 54 to machine frame 68. Thus, in the typical arrangement at least four of the elastomeric shock absorption members 118 would be employed in the arrangement of FIG. 8 to support the cab superstructure to the frame—that is, one at each corner of the bottom portion of the superstructure.

The arrangement of FIG. 8 functions, as has been previously described with reference to 3, 4 and 5, in absorbing energy in the event of force applied to the cab and with an additional advantage of high frequency shock absorption means provided by the employment of elastomeric shock absorption members 118 for affixing the cab to the machine frame.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A cab for rollover protection of a driver of a large off-road machine, the machine having a frame with a longitudinal axis in the direction of normal travel, the machine having opposed sides spaced from a vertical plane of the longitudinal axis and a front, the cab comprising:
    a cab superstructure providing an interior space for an operator, the superstructure having a bottom with an outer edge, an inner edge and a front, the cab superstructure being positioned on a machine frame with the bottom outer edge adjacent a machine side, and the front in the direction of the machine front;
    means of pivotally attaching said cab superstructure inner edge to a machine frame about an axis of pivotation substantially parallel to the machine frame longitudinal axis and limited displacement shock absorption means attaching said cab superstructure outer edge to the machine frame.

2. A rollover protection cab according to claim 1 wherein said shock absorption means employs a crushable medium.

3. A rollover protection cab according to claim 1 wherein said shock absorption means employs hydraulic cylinder means.

4. A rollover protection cab according to claim 1 including high frequency shock absorption means in the attachment of said cab superstructure to a machine frame.

5. A rollover protection cab according to claim 2 wherein said shock absorption means comprises:
    a lower plate having an opening therethrough;
    a paralleled spaced apart upper plate having an opening therethrough, the upper plate being attached to a machine frame;
    a crushable medium of selectable thickness between said lower and upper plate; and
    a draw bolt received in said openings in said plates and through said crushable medium, one end of the bolt being in engagement with said lower plate and the other end in engagement with said cab superstructure.

6. A rollover protection cab according to claim 5 including a plurality of spaced apart said crushable element shock absorption means positioned between said cab superstructure bottom outer edge and the machine frame.

7. A rollover protection cab according to claim 3 wherein said shock absorption means comprises:
    a vertical cylinder closed at the bottom and having a piston rod opening in the top thereof;
    a piston reciprocably received in said cylinder, the piston having a passageway therethrough;
    a pressure release valve in said passageway;
    a piston rod affixed at one end to said piston and the other end to said cab superstructure outer edge; and
    hydraulic fluid within said cylinder.

8. A rollover protection cab according to claim 7 wherein said piston has a second passageway therethrough, and including:
    a second pressure release valve in said second passageway, the first mentioned and the second valves being orientated to permit fluid flow in opposite directions.

9. A rollover protection cab according to claim 7 including a plurality of spaced apart said hydraulic shock absorption means positioned between said cab superstructure bottom outer edge and the machine frame.

10. A roll over protection cab according to claim 5 including:
    a large elastomeric grommet having an opening therethrough with integral enlarged diameter upper and lower portions and where the machine frame includes a frame plate having an opening therethrough with the grommet received therein, the grommet enlarged diameter portions thereof positioned respectively above and below the frame plate, and said draw bolt being received through the grommet with said upper plate in contact with said grommet lower enlarged diameter portion.

11. A rollover protection cab according to claim 7 wherein the machine frame includes a horizontal plate having an opening therethrough and including:
    a large elastomeric grommet having an opening therethrough and an intermediate portion with integral enlarged diameter upper and lower portions, the grommet intermediate portion being received in the frame plate with the upper and lower enlarged diameter portions respectively above and below the frame plate, and with said piston rod received through the grommet opening and with said cylinder in contact with the grommet lower enlarged diameter portion.

12. A rollover protection cab according to claim 1 including:
    a control instrumentation module affixed to said cab superstructure front.

13. A rollover protection cab according to claim 1 wherein said cab superstructure is in the form of a generally rectangular box structure having a back opposed to said front, a top opposite to said bottom and opposed right and left sides, the opposed sides having bottom edges coincident with said bottom inner and outer edges.

14. A rollover protection cab according to claim 13 including:

right and left hand door modules affixed to said cab superstructure right and left hand sides respectively.

15. A rollover protection cab according to claim 13 including:
an environmental control module secured to said cab superstructure back for controlling physical conditions within the cab.

16. A rollover protection cab according to claim 1 including:
a floor module removable attachable to said cab superstructure bottom.

* * * * *